Sept. 7, 1954  A. SKRETTING  2,688,416
ROTARY VALVE
Filed Oct. 19, 1950
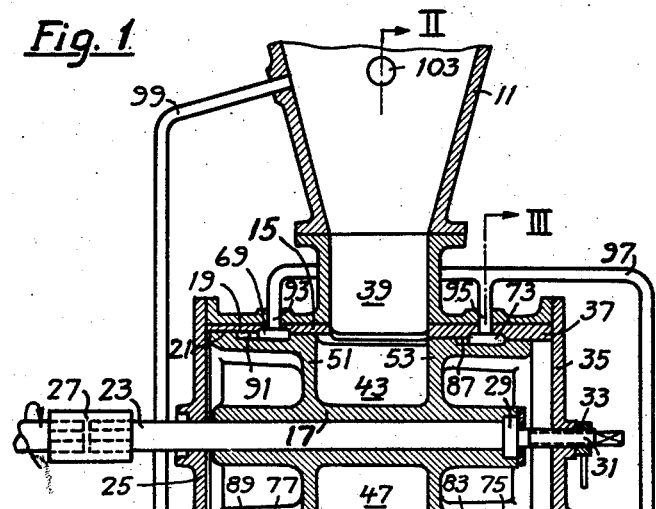
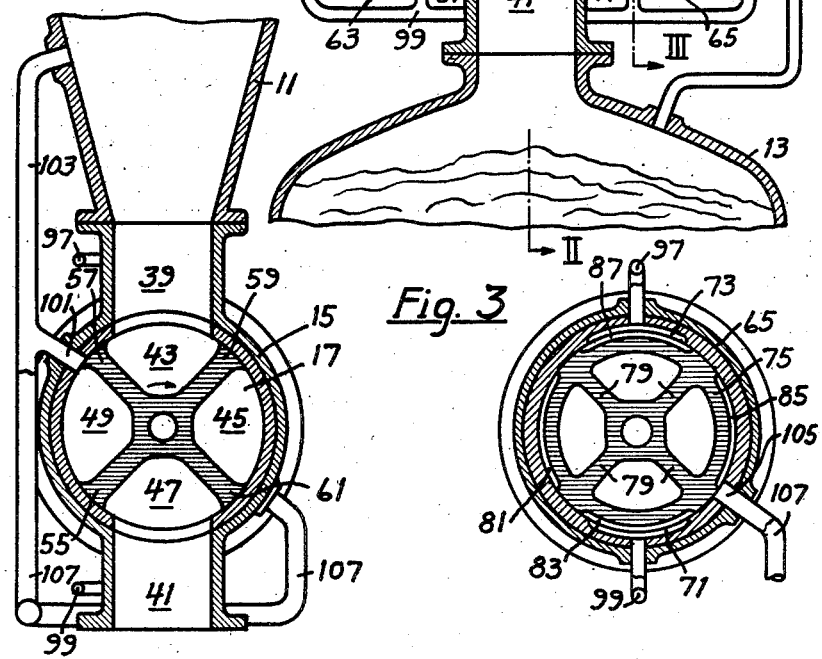
INVENTOR
ARNE SKRETTING
By: Young, Emery & Thompson
Attys.

UNITED STATES PATENT OFFICE 2,688,416

ROTARY VALVE

Arne Skretting, Karlstad, Sweden, assignor to Aktiebolaget Kamyr, Karlstad, Sweden, a company of Sweden Application October 19, 1950, Serial No. 190,920

Claims priority, application Sweden October 21, 1949

1 Claim. (Cl. 214—17)

The present invention relates to a rotary valve adapted for use in the feeding of wood chips, straw or similar cellulose-containing fiber material into a pressure vessel, which valve consists of a housing having an inlet preferably placed at the top and an outlet placed diametrically opposite thereto, and of an essentially horizontal plug turnable in said housing and provided with one or more pockets which in operation are alternatingly put into communication with the inlet and the outlet of the housing.

In such valves the plug is subjected to a considerable lateral pressure, due thereto that the pressure prevailing in the vessel acts upon the part of the plug opposite the outlet of the housing and in the pocket or pockets that at the time being communicate with said outlet, and that pressure is counter-acted merely by the lower pressure, ordinarily atmospheric pressure, prevailing in the inlet of the housing and in the pockets communicating therewith. On account of said lateral pressure very heavy bearings are required for the plug to keep the same centered, and even if a clearance is provided between the plug and the housing which, however, is disadvantageous and causes leakage, the plug is apt to jam and will anyway require a relatively large motor for its turning.

The present invention has for its object to effect a pressure balance, so that the plug can be turned easily and its bearing no longer offers any difficulties. According to the invention this is attained thereby, that the housing and the plug are extended axially to both sides of their centre parts provided with inlet and outlet and pockets, respectively, and recesses serving as pressure chambers are formed in the contacting surfaces of the extensions of the housing and the plug. Recesses are preferably formed in the inner surface of the extensions of the housing, and said recesses are positioned diametrically opposite to but axially displaced on either side of the recess in said surface formed by the outlet of the housing. Similarly, in correspondence to the recess in the inner surface of the housing formed by the inlet there are formed recesses in the inner face of the extensions of the housing, which recesses are positioned diametrically opposite to but axially displaced in relation to said first-mentioned recess. Preferably, the extensions of the plug on either side of its pocketed centre part are also provided with recesses, which recesses are of the same extension in the peripherical direction as, and with regard to the axis of the plug, are symmetrically positioned in relation to the recesses in the surface of the centre part of the plug, formed by the pockets. In the axial direction each of said first-mentioned recesses in the plug extensions has a length about half as long as the axial length of the pockets, whereby the total area of each pair of recesses in the end parts of the plug essentially corresponds to the area of the intermediate pocket located diametrically opposite to said pair of recesses. In order to attain pressure balance the closed chambers formed by the recesses in the extensions of the housing and plug are to be put into communication with the same pressure as prevails at the diametrically opposite parts of the centre portion of the housing and the plug, and to this object exterior conduits may be provided or channels may be formed in the material of the housing or the plug.

An embodiment of the rotary valve according to the invention is shown in the accompanying drawing. Fig. 1 is an axial sectional view of the same, and Figs. 2 and 3 are cross-sectional views taken along the line II—II and III—III, respectively, in Fig. 1.

In the drawing, the rotary valve is shown inserted between a hopper 11 and a pressure vessel 13, which is assumed to be a digester for continuous digestion of wood chips by treatment with a suitable liquor at elevated pressure and temperature, for instance at a pressure of the order of 10 atmospheres. From the hopper where usually atmospheric pressure prevails, the chips are to be continuously fed into the digester, wherein said high pressure is maintained.

The main parts of the rotary valve consist of a stationary housing 15 and a plug 17 turnable therein. The housing has a through, somewhat conical bore 19. The plug is formed with a similar conical surface 21 and is inserted into said bore, so that plug and the housing bear against each other along their conical surfaces with a sealing fit. The plug is rigidly attached to a shaft 23 which protrudes through a stationary end wall 25 of the housing and the end of which is connected by means of a coupling 27 to a motor (not shown) for the turning of the plug. At the other end the plug is connected by means of a suitable bearing 29 to a threaded pin 31 which does not rotate together with the plug and which is threaded into the other end wall 35 of the housing and is locked against turning by a nut 33. Said pin 31 serves to keep the plug in the axial position that corresponds to a suitable clearance between or tightening of the conical surfaces, and to effect an adjustment according as the plug wears down. As is shown in the drawing, the conical bore of the housing may be provided with a lining 37 which e. g. consists of anti-friction metal. Instead of the shown conical shape it is also possible to make the bearing surfaces of the housing and the plug cylindrical in which case, however, the wear of the plug cannot be compensated by axial displacement thereof.

The center parts of the housing and the plug, viz. approximately the middle third thereof in Fig. 1, correspond essentially to the design of conventional rotary valves. Thus, the housing has an inlet 39 on top and an outlet 41 located diametrically opposite, i. e. at the bottom. In cross-section the inlet and the outlet are rectangular, at least at their ends facing the plug, and consequently the conical surface of the housing shows rectangular recesses, where the housing does not bear against the plug and where, therefore, the pressure prevailing in the inlet and the outlet is always present. The centre part of the plug is provided with four pockets 43, 45, 47 and 49 bounded partly by end walls 51, 53, which always form seals towards the housing along annular surfaces on either side of the inlet 39 and the outlet 41, partly by radial partitions 55, 57, 59, 61, which form seals towards the housing along axially directed band-shaped surfaces, when said partitions face other parts of the housing than the inlet 39 and the outlet 41. At least one and at most two of the pockets are always in communication with the inlet, and at least one and at most two of the remaining pockets are simultaneously in communication with the outlet. When the plug rotates, the pockets will successively be put into communication first with the inlet and then with the outlet, and as no pocket can at the same time be in communication with both the inlet and the outlet, it is apparent that chips will be fed from the hopper 11 into the digester 13 without the inlet and the outlet ever being in direct communication with each other. The digester pressure acts upon the plug partly at the part of its conical surface that faces the outlet, partly in the pocket or pockets open towards the outlet. The pressure forces acting in different direction on the walls of the pocket give a resulting force of the same magnitude as if the pressure acted instead on the imaginary conical surface bounded by the walls of the pocket. That means that the pressure force is determined, not by the depth of the pocket but exclusively by the area of the recess formed by the pocket in the conical surface of the plug. In other words, the total pressure acting upon the plug is determined by the location and the size of those parts of the conical surface common to the housing and the plug where said housing and plug do not bear against each other and where the pressure has access. Apparently the total pressure acting upon the plug will vary as to magnitude as well as to direction when the plug rotates.

According to the invention, in order to compensate said pressure the housing and the plug are formed with extensions on both sides of the above-described centre part. The extensions 63, 65 of the housing are provided in their inner conical surface with shallow recesses 67, 69, 71 and 73. The recesses 69 and 73 have a peripherical length equal to that of the outlet 41 and they are so located that their bordering edges parallel to the axis are diametrically opposite the bordering edges of the outlet 41 parallel to the axis. The axial length of the recess 69 and 73 in total is equal to the axial length of the outlet 41, and each of them has a length approximately equal to half the axial length of the outlet. Further the recesses 69 and 73 are located essentially symmetrically on either side of the inlet 39. Therefore, to the recessed part of the conical surface of the plug, formed by the outlet 41, there corresponds a recessed surface located diametrically opposite and having the same size, but the latter surface is divided up into two halves which are axially displaced at equal distances from the outlet in opposite directions, whereby full balance is had between said recessed surfaces on opposite sides. Similarly, the recesses 67 and 71 are positioned diametrically opposite the inlet 39 but are axially displaced, so that they are located on either side of the outlet 41, and their dimensions are such that the recess in the conical surface of the housing, formed by the inlet, is balanced by the recesses 67 and 71, with regard to the axis of the conical surface. Moreover, all recesses balance each other with regard to a line perpendicular to the plane of the paper in Fig. 1 and located midway between the inlet and the outlet.

The extensions of the plug consist of tubular, somewhat conical flanges 75, 77 joined to the periphery of the end walls 51, 53 of the pockets and reinforced by radial walls 79. Cut out in the outer surface of the flange 75 are four shallow rectangular recesses 81, 83, 85, 87, whereas the rest of said surface bears and forms a seal against the extensions 63, 65 of the housing. The flange 77 is provided with four similar recesses, of which only two, 89 and 91, are shown in Fig. 1. Said eight recesses have a peripherical length equal to the peripherical length of the pockets measured along the conical surface, and their axial dimension is about half of that of the pockets. On either side of the recesses are located about equally far from the end walls 51, 53, and their axially directed border edges are situated diametrically opposite the axially directed border edges of the corresponding pockets. Therefore, corresponding to the recess in the conical surface of the centre part of the plug, formed by each of the pockets, there are two recesses in the ends of the plug, located diametrically opposite to and having a total area equally large as the first-mentioned recess.

The upper recesses 69, 73 in the side extensions of the housing are by means of through holes 93, 95 and a conduit 97 put into communication with the interior of the digester 13, whereby the pressure prevailing therein is transmitted to the two closed pressure chamber formed by said recesses 69, 73 and the recesses in the ends of the plug communicating therewith for the time being. On account of the above-described location of the recesses in the extensions of the housing and the plug, put under digester pressure through the conduit 97, viz. diametrically opposite to the outlet and the pockets communicating therewith, the two extensions of the plug will be influenced by forces which at least in the main balance the lateral forces acting from the lower side upon the centre portion of the plug.

The spaces formed by the lower recesses 67, 71 in the side extensions of the housing are connected to a conduit 99 which preferably ends into the hopper 11 but which can also lead to some other place where the atmospheric pressure (or a low pressure) prevails. Through said connection the atmospheric pressure is transmitted into the chambers formed by the recesses 67, 71 and the recess in the plug communicating therewith, whereby also the side pressure acting upon the plug in the inlet is compensated. Said conduit 99 is provided with branches extending through the end walls 25, 35 of the housing and serving to carry off gases from the digester, which may have leaked past the plug.

In the shown position of the plug the pocket 45 is wholly cut off from connection with other spaces. Assuming that the plug rotates clockwise, said pocket was closed exactly when the wall 59 reached the right-hand edge of the inlet 39. The pressure in the pocket which up to then was equal to the pressure in the inlet, is essentially maintained but will increase somewhat due to leakage of digester gases past the wall 61. The recesses 81 in the extensions of the plug, which are located diametrically opposite to said pocket 45, were simultaneously shut off from connection with the recesses 71 where the same pressure prevails as in the inlet, and the pressure therein will then also increase somewhat due to leakage past the plug part located between recesses 81 and 83. Therefore, even the pressure in the pocket 45 is balanced by a counteracting pressure upon the ends of the plug. However, since the recesses 81 have a total volume less than that of the pocket 45, leaking gases will increase the pressure faster in the recesses 81 than in the pocket 45, and therefore the balance will not be complete in all positions.

The same applies to the pocket 49. When the wall 55 has reached the left-hand edge of the outlet 41 shutting off the pocket 49, at first the same high pressure prevails therein as in the outlet, but then said high pressure decreases due to leakage past the wall 57. The recesses 85 in the end extension of the plug were simultaneously shut off from connection with the recess 73 wherein digester pressure prevails, and therefore, the pressure in these recesses will also decrease at first due to leakage, but somewhat faster than in the pocket 49 on account of the smaller volume of the recesses 85.

An aperture 101 in the centre section of the housing is so located that it is uncovered by the wall 57 comparatively soon after the pocket 49 has been closed by the wall 55. Said aperture communicates with the side of the hopper 11 by means of a conduit 103. The gas under high pressure present in the pocket 49 is carried off through that connection, whereby the pressure therein decreases comparatively fast to atmospheric pressure. Therefore, no real pressure difference between the pocket 49 and the inlet 39 is left when they are put into communication with each other in a later position. By leading off the pressure gas through the conduit 103 the feeding of chips into the pockets is made easier, the chips not encountering any countercurrent of gas in the inlet or the hopper.

In order to compensate the pressure drop occurring in the pocket 49 when the aperture 101 is uncovered, each of the side extensions of the housing is provided with a separate aperture 105, and said two apertures are located diametrically opposite to the aperture 101 and are by means of conduits 107 connected to the hopper 11. Therefore, the recesses 85 are put into communication with the atmospheric pressure simultaneously with the pocket 49, so that the pressure in the latter will be balanced by the pressure in the two recesses 85, even in the shown position of pocket 49. The recesses 85 have a total volume smaller than the pocket 49 and will therefore be emptied of gas faster, and consequently the pressure balance is not perfect during a short interval. On the other hand, by making the recesses 85 shallow the advantage is gained that the amount of gas necessary for the pressure compensation and let out through said recesses is small.

As above described, the lateral pressures upon the plug are balanced merely approximately which, however, will do in the practice. It is hardly possible to attain a perfect balance due to dissimilar leaking conditions, the conical shape of the plug, the changed position of the plug in the housing after its adjustment due to wear, and so on. Therefore, it lies within the scope of the invention knowingly not to aim at a perfect compensation. Thus for instance, the total axial length of the recesses 67, 69, 71 and 73 in the extensions of the housing may be made considerably shorter than the axial length of the inlet 39 and the outlet 41. This depends thereupon that unbalance caused thereby is of no importance in comparison with other unavoidable reasons for an imperfect pressure compensation.

I claim:

In a valve for continuously introducing fiber material into a pressure vessel, a valve housing having a horizontal conical bore, an inlet piece on the center part of the housing forming a vertical channel for the supply of fiber material and having an orifice in the upper side of the conical bore, an outlet piece on the center part of the housing having an orifice in the lower side of the conical bore diametrically opposite to the inlet orifice and forming a vertical channel for transmission of fiber material to the pressure vessel, a conical plug fitting into said bore and rotatable therein, a center zone of said plug having a number of pockets distributed around the circumference of the plug and being separated from each other by radial walls, said pockets being adapted to be brought alternately and successively into communication with the inlet orifice and the outlet orifice of the valve housing in order to pass fiber material through the valve, the end parts of the valve housing each having in the conical surface a recess coextensive in the peripheral direction with the outlet orifice and located diametrically opposite to said orifice, conduits connecting said recesses to the pressure vessel to equalize the pressure difference therebetween, the plug having at each of its ends a number of recesses corresponding to the number of pockets, each of said recesses being coextensive in the peripheral direction with a corresponding pocket and located diametrically opposite thereto, said recesses in the end of the plug being adapted to communicate successively through said recesses in the end of the housing and said conduits with the pressure vessel, whereby the pressure acting upon the plug in the pockets in communication with the pressure vessel is balanced by the pressure acting upon the plug in the recesses of the plug ends.

References Cited in the file of this patent

UNITED STATES PATENTS

| Number | Name | Date |
| --- | --- | --- |
| 941,024 | Mantius | Nov. 23, 1909 |
| 1,614,890 | Kruttschnitt | Jan. 18, 1927 |
| 1,796,808 | Roberts | Mar. 17, 1931 |
| 1,977,181 | Foresman | Oct. 16, 1934 |

FOREIGN PATENTS

| Number | Country | Date |
| --- | --- | --- |
| 451,562 | Great Britain | Aug. 7, 1936 |
| 684,793 | Germany | Dec. 5, 1939 |